UNITED STATES PATENT OFFICE.

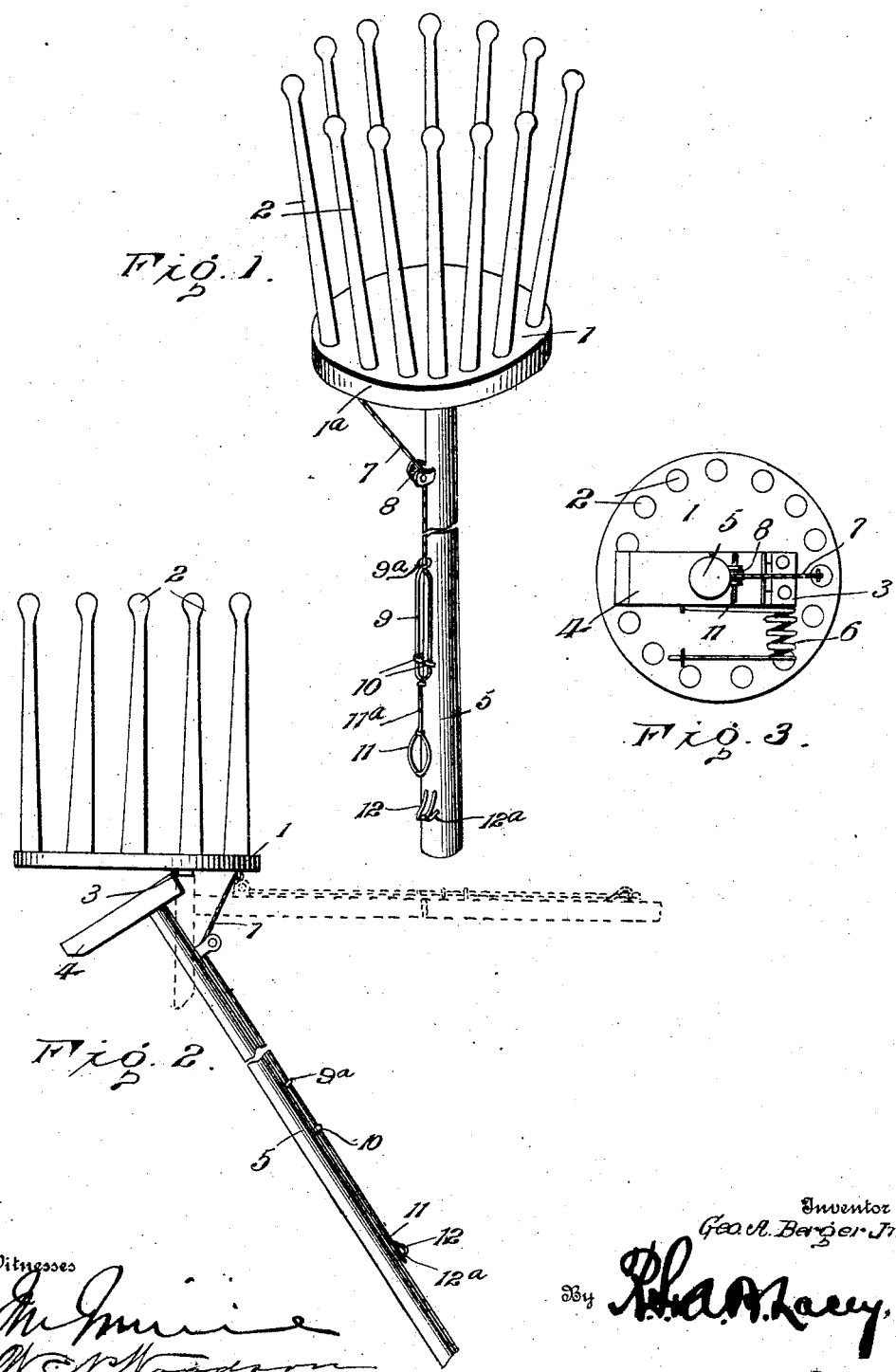

GEORGE A. BERGER, JR., OF FREMONT, OHIO.

FRUIT-PICKER.

No. 848,876.  Specification of Letters Patent.  Patented April 2, 1907.

Application filed December 21, 1906. Serial No. 349,003.

*To all whom it may concern:*

Be it known that I, GEORGE A. BERGER, Jr., a citizen of the United States, residing at Fremont, in the county of Sandusky and State of Ohio, have invented certain new and useful Improvements in Fruit-Pickers, of which the following is a specification.

This invention contemplates certain new and useful improvements in that class of fruit-pickers which are designed to be held aloft and which embody a basket on the upper end of a pole adapted to be turned in the branches of the tree so as to cause the fruit to drop into the basket; and the object of my invention is to provide a fruit-picker of this type which will embody comparatively few parts and which may be efficiently and easily operated to pick a considerable quantity of fruit before it is necessary to lower the device and empty it of its contents.

With this and other objects in view, which will more fully appear as the description proceeds, the invention consists in certain constructions and arrangements of the parts hereinafter described and claimed, reference being had to the accompanying drawings, in which—

Figure 1 is a perspective view of my improved fruit-picker. Fig. 2 is a side elevation thereof, the basket support or pole being shown in two different tilted positions in full and dotted lines. Fig. 3 is a bottom plan view.

Corresponding and like parts are referred to in the following description and indicated in all the views of the drawings by the same reference characters.

Referring to the drawings, the numeral 1 designates the base of the basket of my fruit-picker, said base being preferably circular and preferably formed of wood.

2 designates a series of upright pegs which are fastened at one end in the base 1 and which preferably diverge from the base to a slight degree and which taper toward their outer ends, where they are provided with blunt heads, so as to in no wise injure the fruit that is being picked by their use. The basket, which is composed of the base 1 and pegs 2, is susceptible to adjustment by having the base 1 secured eccentrically to one member of a hinge 3, the other member of said hinge being secured to one end of a preferably flat head 4. The head 4 is secured in any desired manner on one end of a pole 5, which may be of any desired length and thickness.

6 designates a spring, one end of which is secured to the base and the other to the head 4, the tension of the spring being exerted to draw the base down upon the head, and thereby maintain the basket in longitudinal alinement with the pole 5.

A cable 7 is secured at one end to an eye on the base 1 in longitudinal alinement with the hinge 3 and head 4, as shown, and the said cable extends over a roller 8 on the pole 5, and thence downwardly and is attached at its outer end to an eye $9^a$, formed at one end of a link 9. The link 9 has its two members guided longitudinally of the pole within staples or similar devices 10, as shown, and one end of said link is provided with a loop 11, connected to the link proper by means of the rod $11^a$.

12 designates spaced keepers that are secured to the pole 5, said keepers producing downwardly-facing shoulders $12^a$.

In the practical use of my improved fruit-picker the basket is held aloft on the ends of the pole 5, and the apples, oranges, or other fruit are picked by turning the device around with the pole as an axis. As the fruit is thereby gently knocked off by the pegs 2 it will fall into the basket, and after the basket has been sufficiently filled the operator lowers the device to empty the basket of its contents. In so doing it is obvious that the basket should be tilted with respect to the pole, because the pole itself must be tilted as it is lowered to the ground. To accomplish this tilting of the basket and without the necessity of changing the position of one's hands from the lower end of the pole, I provide the cable 7 and the link 9 and its loop 11, before described, so that when the basket is being lowered the operator may place the loop over the spaced keepers 12, so that its outer end may be engaged by the shoulders $12^a$. This will manifestly result in the basket being tilted against the tension of the spring 6; and if it be desired to tilt the basket to a further degree, such as at right angles to the pole, the loop is drawn farther down and the rod $11^a$ inserted between the spaced keepers 12, so that the outer side of the loop may be engaged by the shoulders $12^a$, as indicated in Fig. 2 of the drawings. I deem it within the purview of my invention to maintain the basket at different angles with respect to the pole other than the angle just described, and shown in the accompanying drawings, the varying degrees of tilting being determined by the particular use for which the device is intended or the peculiar circumstances upon which it might be operated. It is obvious that the device may be used by an operator upon a step-ladder as well as upon the ground and that the basket may be secured at any angle desired by the operator. It is also manifest that the operator by pulling upon the finger-loop 11 may hold the basket tilted to any desired degree whatever, so long as he holds on to the said loop.

From the foregoing description, in connection with the accompanying drawings, it will be seen that I have provided a very simple construction of fruit-picker which possesses the advantages above set forth and which may be cheaply constructed and which will be durable.

Having thus described the invention, what is claimed as new is—

1. A fruit-picking device comprising a pole, a basket hinged on said pole and spring-pressed into longitudinal alinement therewith, and a cable secured to said basket eccentrically of its hinge and adapted to extend down along the pole whereby the said cable may be pulled upon from the lower end of the pole, and the basket thereby tilted upon the pole.

2. A fruit-picking device, comprising a pole, a basket hinged on said pole and spring-pressed into longitudinal alinement therewith, a cable secured to said basket eccentrically of the hinge thereof, a running connection between said cable and the pole, and means for securing the cable rigidly to the pole.

3. A fruit-picking device comprising a pole, a basket hinged on said pole and spring-pressed into longitudinal alinement therewith, a cable secured to said basket, the pole being provided with a roller over which said cable passes, and a finger-loop connected to said cable and adapted to draw the same along the pole whereby to tilt the basket.

4. A fruit-picking device comprising a pole, a basket mounted to tilt on said pole, a cable secured to said basket, a link to which the cable is attached, the link being mounted to slide longitudinally on the pole and provided at one end with a finger-loop, and keepers adapted to be engaged by said loop, as and for the purpose set forth.

5. A fruit-picking device, comprising a pole, a basket mounted to tilt on said pole, a cable secured to said basket, a link mounted to slide longitudinally on the pole and attached to said cable, said link being provided with a finger-loop and a rod which connects the finger-loop and the link, and a pair of spaced keepers secured to said pole and provided with downwardly-facing shoulders, the loop being adapted to be inserted over said keepers whereby to hold the basket tilted at one angle with respect to the pole, and the rod being adapted to be placed between said keepers with the shoulders of the latter engaging the loop whereby to hold the basket at a greater inclination with respect to the pole.

In testimony whereof I affix my signature in presence of two witnesses.

GEORGE A. BERGER, JR.

Witnesses:
F. E. SEAGER,
W. A. GOSSARD.